United States Patent
Kim et al.

(10) Patent No.: US 10,379,401 B2
(45) Date of Patent: Aug. 13, 2019

(54) DISPLAY DEVICE WITH BACKLIGHT UNIT

(71) Applicant: SAMSUNG ELECTRONICS CO., LTD., Suwon-si (KR)

(72) Inventors: Jong Bin Kim, Suwon-si (KR); Jean Hur, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/797,292

(22) Filed: Oct. 30, 2017

(65) Prior Publication Data

US 2018/0143494 A1     May 24, 2018

(30) Foreign Application Priority Data

Nov. 18, 2016    (KR) .................. 10-2016-0154010

(51) Int. Cl.
    *G09F 13/04*       (2006.01)
    *G02F 1/1335*      (2006.01)
    *F21V 8/00*        (2006.01)

(52) U.S. Cl.
CPC ..... *G02F 1/133608* (2013.01); *G02B 6/0096* (2013.01); *G02F 1/133603* (2013.01); *G02F 1/133605* (2013.01); *G02F 1/133615* (2013.01); *G02F 1/133606* (2013.01)

(58) Field of Classification Search
CPC .... G02F 1/133603; G02F 1/605; G02F 1/606; G02F 1/608
See application file for complete search history.

(56) References Cited

U.S. PATENT DOCUMENTS

| | | | | |
|---|---|---|---|---|
| 4,622,486 A | * | 11/1986 | Endo | H01K 1/46 313/115 |
| 2007/0236626 A1 | * | 10/2007 | Koganezawa | G02B 6/0083 349/61 |
| 2012/0169943 A1 | * | 7/2012 | Kuromizu | G02F 1/133604 348/790 |
| 2012/0274871 A1 | * | 11/2012 | Yamazaki | G02F 1/133605 349/58 |
| 2013/0242541 A1 | * | 9/2013 | Kim | F21V 7/00 362/97.1 |
| 2014/0286049 A1 | * | 9/2014 | Cha | G02F 1/133615 362/609 |
| 2016/0124118 A1 | * | 5/2016 | Takahashi | G02B 5/282 351/159.01 |
| 2016/0313606 A1 | * | 10/2016 | Kim | G02F 1/133611 |

FOREIGN PATENT DOCUMENTS

KR    10-2009-0073532 A    7/2009
KR      1020130104560 A    9/2013

OTHER PUBLICATIONS

International Search Report dated Mar. 8, 2018, issued by the International Searching Authority in counterpart International Application No. PCT/KR2017/012487 (PCT/ISA/210).

* cited by examiner

*Primary Examiner* — Ali Alavi
(74) *Attorney, Agent, or Firm* — Sughrue Mion, PLLC

(57) ABSTRACT

A display device includes a display panel, a bottom chassis supporting the rear of the display panel, a light source disposed on at least one side of the bottom chassis, a reflective member disposed between the display panel and the bottom chassis and having a reflective surface for reflecting light emitted from the light source to the display panel, and a reflective holder for fixing one end of the reflective member, the reflective holder reflecting light directed toward the reflective holder to the display panel.

20 Claims, 11 Drawing Sheets

DISPLAY DEVICE WITH BACKLIGHT UNIT

CROSS-REFERENCE TO RELATED APPLICATIONS

This application claims priority from Korean Patent Application No. 10-2016-0154010, filed on Nov. 18, 2016 in the Korean Intellectual Property Office, the disclosure of which is incorporated herein by reference in its entirety.

BACKGROUND

1. Field

Apparatuses consistent with example embodiments relate to a display device, and more particularly, to a display device including a backlight unit.

2. Description of the Related Art

Generally, a display device is a device for displaying a screen, examples of which include a monitor and a television (TV). Display devices may include self-luminous display panels such as organic light-emitting diodes (OLEDs) and light-receiving display panels such as liquid crystal display (LCD) panels.

A light receiving display panel may include a display panel formed of liquid crystal layer, and a backlight unit disposed on the rear side of the display panel.

The backlight unit may include a light emitting diode (LED) module that is a light source to emit light to the display panel. When a light source is disposed on one area of the display panel, there may be a loss of light, and the light may not be uniformly radiated from the light source to the entire area of the display panel, which may result in non-uniform luminance on the entire screen of the display device.

SUMMARY

Example embodiments provide a display device including a backlight unit with a structure to improve light efficiency, improve brightness uniformity, and improve productivity by utilizing light reflection characteristics.

According to an aspect of an example embodiment, there is provided a display device including: a display panel; a bottom chassis supporting the display panel; a light source provided on at least one edge of the bottom chassis; a reflective member disposed between the display panel and the bottom chassis and including a reflective surface configured to reflect light emitted from the light source to the display panel; and a reflective holder configured to fix one end of the reflective member and to reflect light emitted from the light source toward the reflective holder to the display panel.

The reflective holder may include a holder reflective surface extending from the reflective surface.

The inclination of the holder reflective surface may be different from an inclination of the reflective surface adjacent the reflective holder.

The reflective holder may further include a holder body having an insertion space into which at least a part of the reflective member is inserted.

The reflective member may include a member insertion portion, and the holder reflective surface may be disposed closer to the display panel than the member insertion portion.

The holder body may include: an upper holder body on which the holder reflective surface is provided; and a lower holder body in contact with the bottom chassis, the lower holder body and the upper holder body together forming the insertion space, wherein the reflective member is configured to be spaced apart from the bottom chassis.

The width of the holder reflective surface may be greater than a width of the member insertion portion.

The reflective member may have a concave shape, the light source may be disposed to face the reflective surface on a first edge of the reflective member, and the reflective holder is disposed on a second edge of the reflective member.

The holder reflective surface may be opposite to the display panel and may be disposed to be inclined at an angle in a direction toward the light source greater than an angle at which the adjacent reflective surface is inclined.

The reflective member may include: a first reflective member fixed by the reflective holder and configured to diffuse light emitted from the light source toward the display panel; and a second reflective member disposed between the light source and the first reflective member and configured to reflect the light emitted from the light source toward the first reflective member.

The bottom chassis may include: a chassis body configured to support the reflective member, the chassis body being at least partially curved; a reflective space formed on the front surface of the reflective member, the reflective space through which the light emitted from the light source and the light reflected by the reflective member pass; and a chassis flange configured to protrude from the chassis body towards the display panel and configured to form the reflective space with the chassis body, and wherein the reflective holder is disposed along an inner surface of the chassis flange.

The chassis flange may include a first chassis flange on which the reflective holder is disposed, and a pair of second chassis flanges extending from opposite ends of the first chassis flange, and the display device may further may include a flange reflective member disposed on an inner surface of the second chassis flange and configured to extend the length of the reflective surface.

The reflective holder may include a synthetic resin.

The holder reflective surface may be formed in an achromatic color.

The holder body may include: a first holder body on which the holder reflective surface is formed; and a second holder body fixed to the bottom chassis, and wherein the reflective holder comprises a pressing projection protruding from the second holder body into the insertion space to secure the reflective member inserted into the insertion space.

According to an aspect of another example embodiment, there is provided a display device including: a display panel; a bottom chassis supporting the display panel; a light source disposed in the bottom chassis; a reflective member including a first reflective member opposite to the display panel and including a reflective surface having a concave shape and configured to diffuse light emitted from the light source toward the display panel, and a second reflecting member disposed between the light source and the first reflecting member and configured to reflect light emitted from the light source toward the first reflecting member; and a reflective holder including a holder reflective surface extending from a reflective surface of the first reflective member to reflect light to the display panel and configured to fix the first reflective member to the bottom chassis.

The light source may be disposed opposite to the first and second reflective members at a first edge of the reflective member, and wherein the reflective holder is disposed on a second edge of the reflective member such that the holder reflective surface is opposite to the display panel and is inclined toward one of the light source or the reflective member.

The reflective holder may include a holder body having an insertion space and on which the holder reflective surface is provided, the reflective member may include a member insertion portion inserted into the insertion space.

The width of the holder reflective surface may be greater than a width of the member insertion portion.

According to an aspect of another example embodiment, there is provided a display device including: a display panel; a bottom chassis supporting the display panel; a light source provided on a side of the bottom chassis; a reflective member disposed between the bottom chassis and the display panel, and including a reflective surface opposite to the display panel, the reflective surface configured to reflect light emitted from the light source to the display panel; and a reflective holder including an insertion space and configured to receive a member insertion portion formed at one edge of the reflective member into the insertion space, wherein the reflective holder may include: a holder reflective surface having a width that is wider than the member insertion portion and an inclination angle that is greater than an inclination angle of the reflective surface adjacent to the reflective holder.

BRIEF DESCRIPTION OF THE DRAWINGS

The above and/or other aspects will become apparent and more readily appreciated from the following description of the example embodiments, taken in conjunction with the accompanying drawings of which.

DETAILED DESCRIPTION

Figure 1:
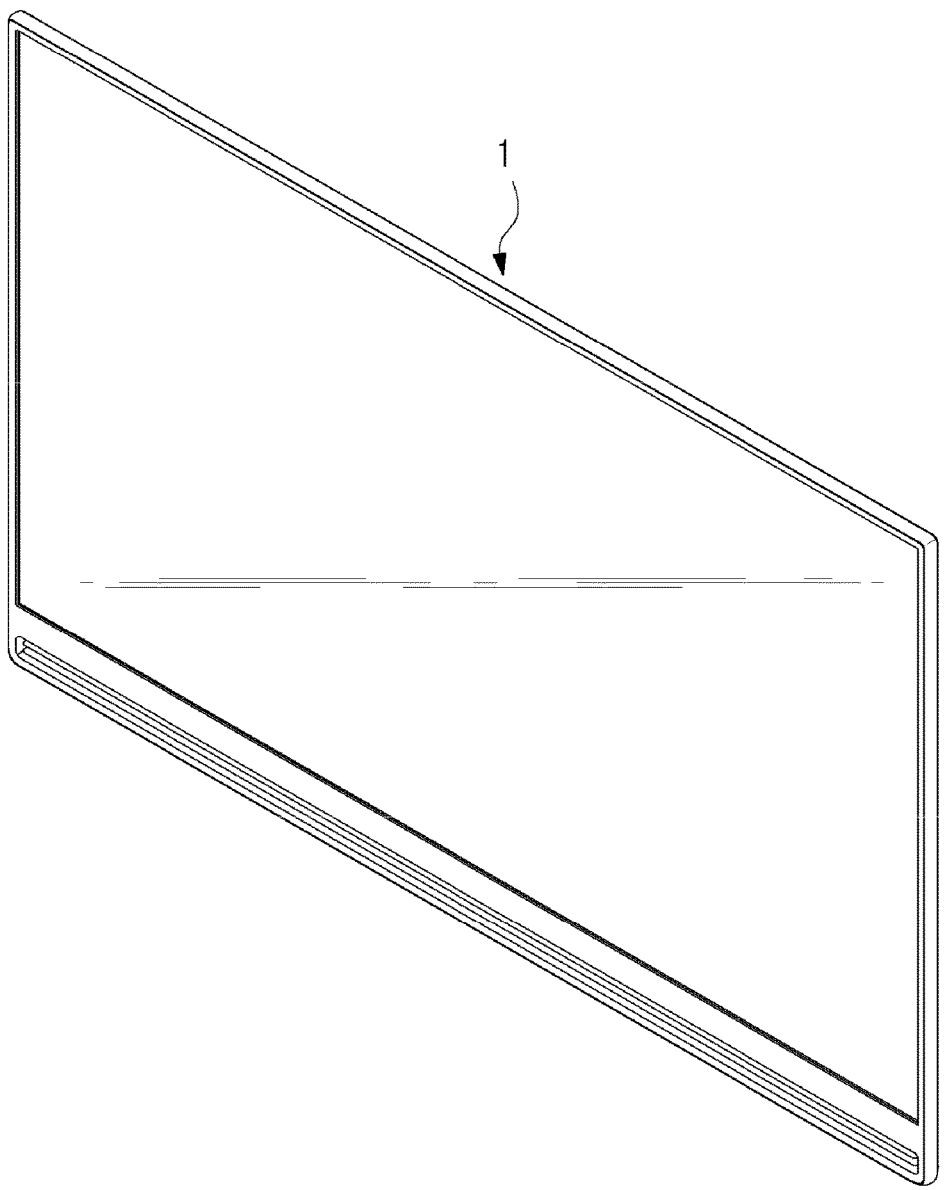
FIG. 1 is a perspective view of a display device according to an example embodiment.

The example embodiments described in this specification and configurations illustrated in drawings are not intended to limit the present disclosure to particular modes of practice, and it is to be understood that all equivalents, modifications, and alternatives that do not depart from the spirit and technical scope of the present disclosure are encompassed in the present disclosure.

Also, throughout the entire specification, the same reference numerals refer to the same components or elements to serve substantially the same function.

Also, the terminology used herein is for the purpose of describing example embodiments only and is not intended to be limiting of the present disclosure. Also, as used herein, the singular forms "a," "an," and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Also, it will be understood that, although the terms including ordinal numbers such as "first," "second," etc. may be used herein to describe various elements, these elements are not limited by these terms. These terms are only used to distinguish one element from another. For example, a second element could be termed a first element without departing from the teachings of the present disclosure, and similarly a first element could be also termed a second element. The term "and/or" includes any and all combinations of one or more of the associated, listed items.

Hereinafter, "front" and "front views" refer to front and forward direction on which images are displayed on a display device 1 shown in FIG. 1, and "rear direction" refers to direction opposite from the front direction toward the rear of the display device 1.

Example embodiments provide a flat display device, but embodiments are not limited thereto, and may also be applicable, for example, to a curved surface display device or a display device having a curved surface and a variable bendable or flexible display device.

In addition, example embodiments may be applied to a display device regardless of the screen size. For example, example embodiments may be applied to portable TVs, monitors, and other portable products such as tablets, laptops, smart phones, ebooks, and the like.

In addition, a plurality of light sources of the backlight unit described below may be referred to as "light sources."

Figure 2:
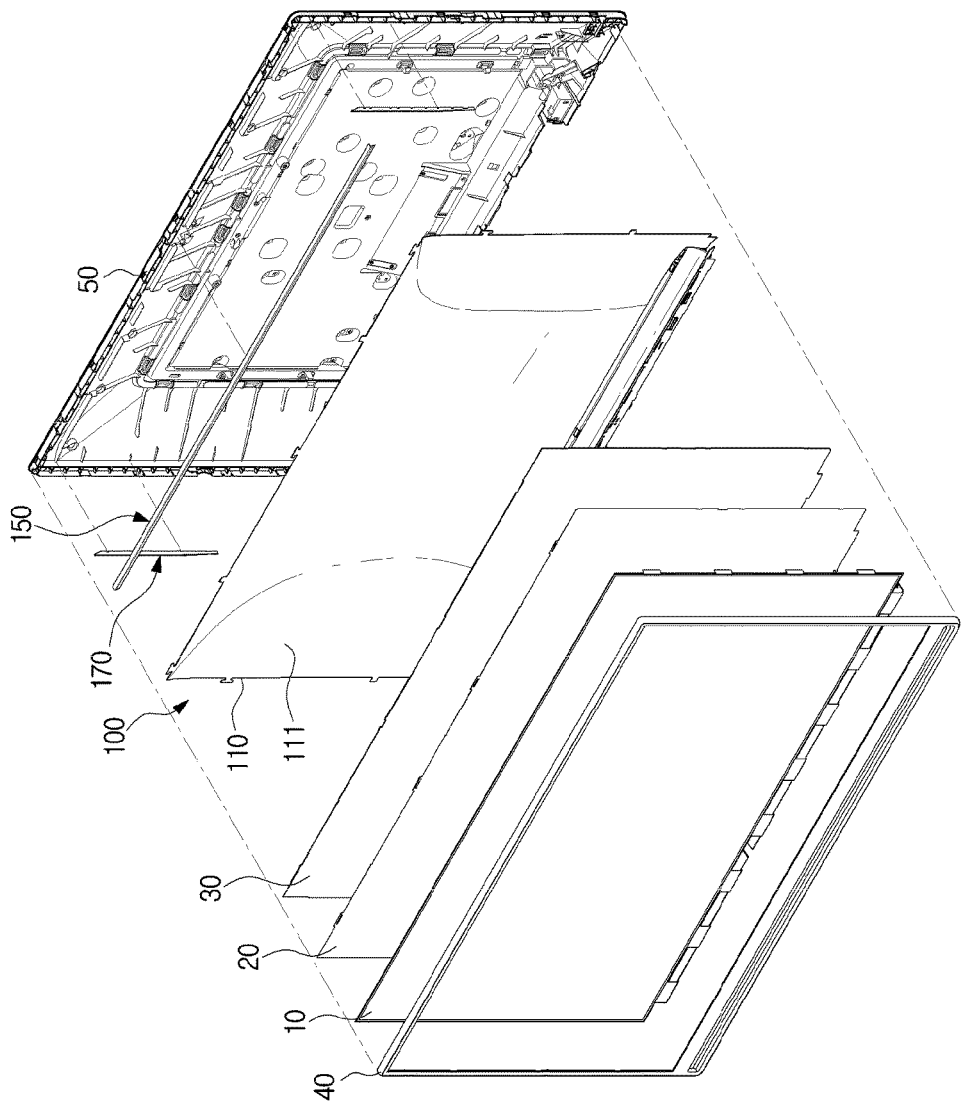
FIG. 2 is an exploded perspective view of a display device according to an example embodiment.
Figure 3:
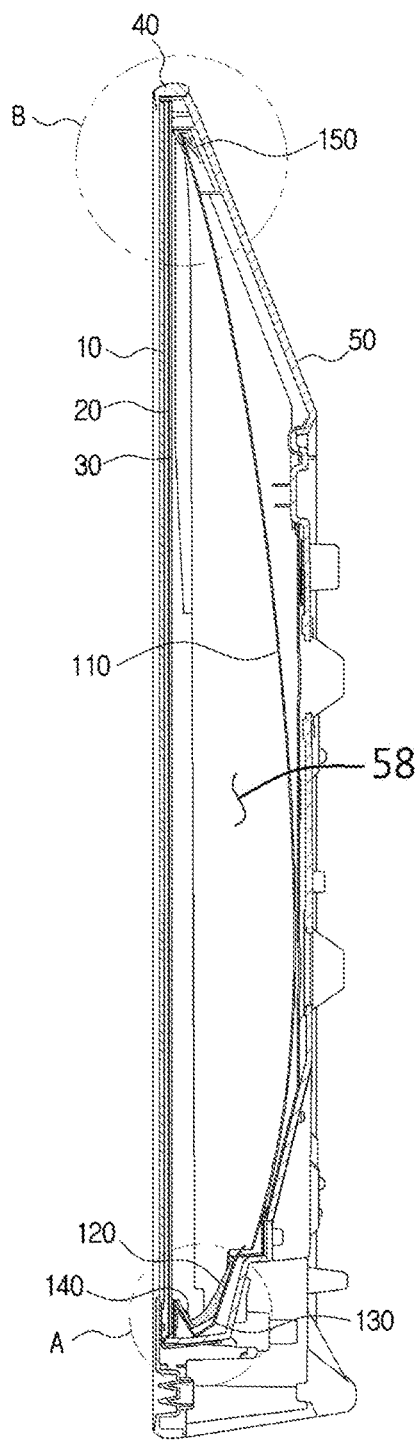
FIG. 3 is a side cross-sectional view of a display device according to an example embodiment.
Figure 4:
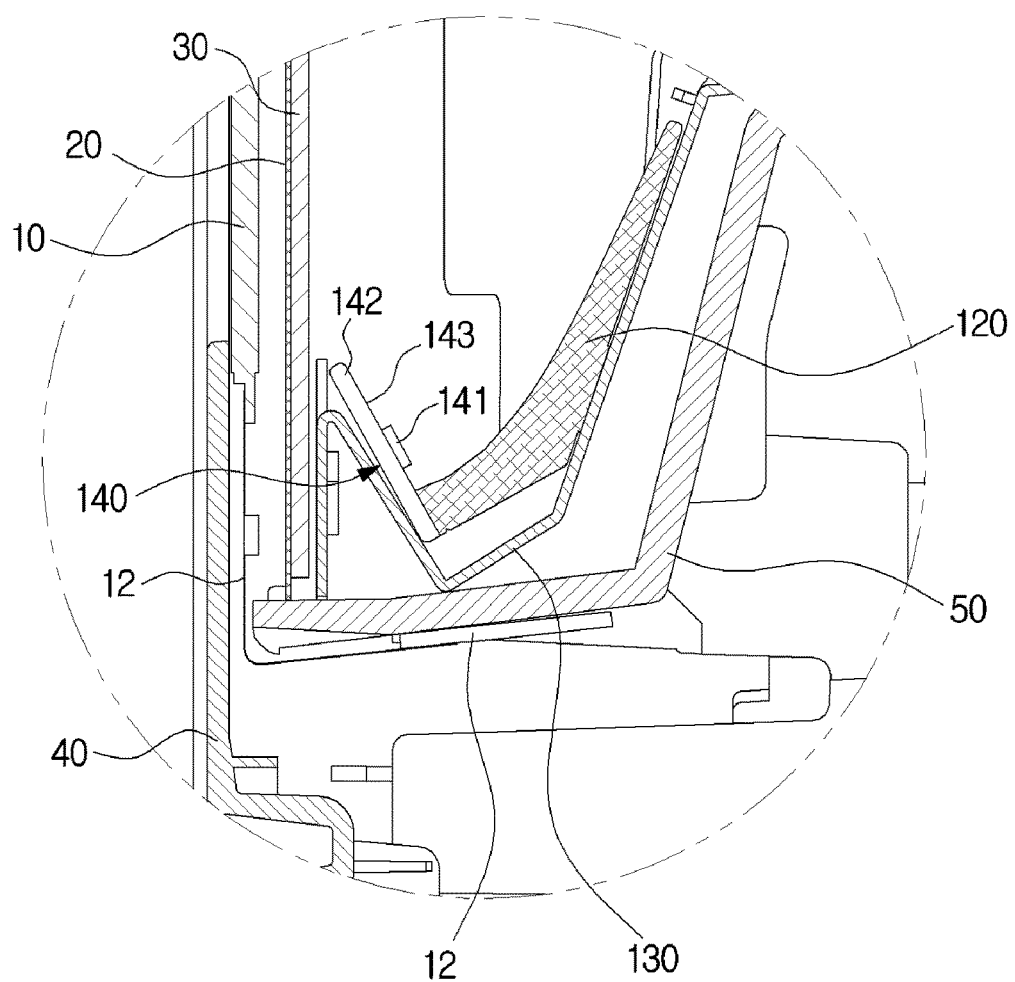
FIG. 4 is an enlarged view of A in FIG. 3.
Figure 5:
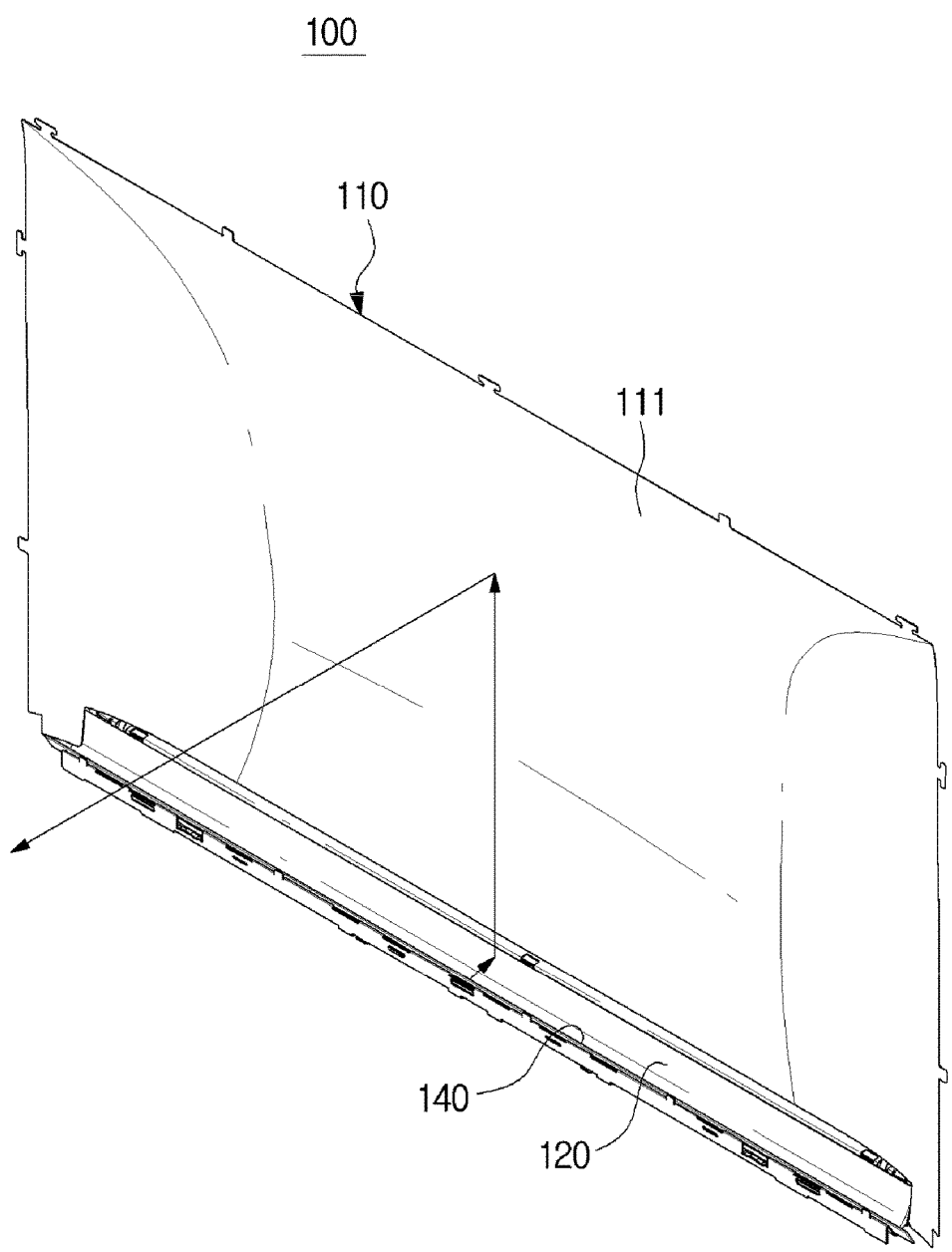
FIG. 5 is a perspective view of a part of the configuration of a display device according to an example embodiment.
Figure 6:
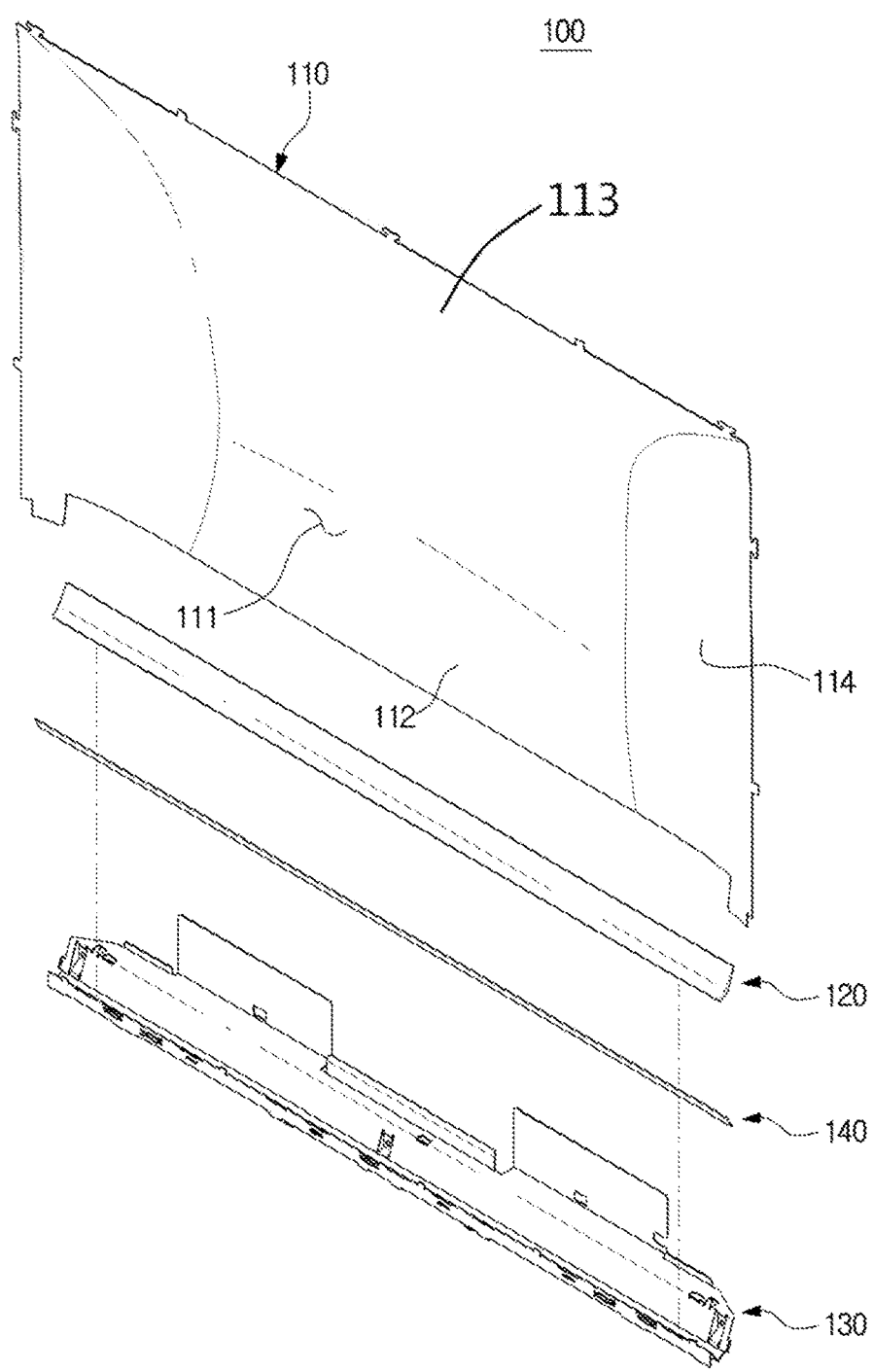
FIG. 6 is an exploded perspective view of a part of the configuration of a display device according to an example embodiment.

FIG. 1 is a perspective view of a display device according to an example embodiment. FIG. 2 is an exploded perspective view of a display device according to an example embodiment. FIG. 3 is a side cross-sectional view of a display device according to an example embodiment. FIG. 4 is an enlarged view of A in FIG. 3. FIG. 5 is a perspective view of a part of the configuration of a display device according to an example embodiment. FIG. 6 is an exploded perspective view of a part of the configuration of a display device according to an example embodiment.

The display device 1 may include a display panel 10 configured to display an image, a diffusion plate 30, an optical sheet 20, a top chassis 40, and a bottom chassis 50. The diffusion plate 30 may be disposed behind the display panel 10 so that the light transmitted from the rear side is diffused and transmitted to the display panel 10 located on the front side of the diffusion plate 30. The optical sheet 20 may be disposed between the display panel 10 and the diffusion plate 30 to improve the optical characteristics of the light diffused by the diffusion plate 30. The top chassis 40 may be coupled to the front side of the display panel 10.

The bottom chassis 50 may be coupled to the rear side of the top chassis 40 and support the display panel 10.

A backlight unit 100 for providing light to the display panel 10 may be disposed on the rear side of the diffusion plate 30. The display device 1 may further include a middle mold coupled between the top chassis 40 and the bottom chassis 50 to support the display panel 10.

The display panel 10 may include a liquid crystal panel formed by sealing a liquid crystal between two glass substrates each including electrodes.

The optical sheet 20 may include a diffusion sheet for diffusing light transmitted through the diffusion plate 30, a prism sheet for allowing diffused light to be converged in a direction normal to the surface of the display panel 10, a protective sheet for protecting the prism sheet, and the like.

The top chassis 40 may be disposed on the front side of the display panel 10 and coupled to the bottom chassis 50 disposed on the rear side of the display panel 10. The display panel 10, the optical sheet 20, and the diffusion plate 30 may be supported by the bottom chassis 50 within the space defined between the top chassis 40 and the bottom chassis 50. Also, the display panel 10, the optical sheet 20, and the diffusion plate 30 may be supported by a middle mold disposed between the top chassis 40 and the bottom chassis 50. The front chassis of the middle mold may be supported by the top chassis 40 and the bottom chassis 50.

According to an example embodiment, the top chassis 40 may form the front surface of the display device 1 without a separate cover member. However, embodiments are not limited thereto, and a front cover covering the top chassis 40 may be separately provided to form a front side external appearance of the display device 1.

The bottom chassis 50 is disposed behind the display panel 10 and may support the display panel 10 as described above. The bottom chassis 50 may form the outer appearance of the display device 1 without a separate cover member. However, embodiments are not limited thereto, and a rear cover may be separately provided on the rear side of the bottom chassis 50 to form a rear side external appearance of the display device 1.

The backlight unit 100 may include a light source module 140. The light source module 140 may include a plurality of light sources 141 and a substrate 142 on which the plurality of light sources 141 are installed. The light source 141 may include a light emitting diode (LED) to provide a thinner display device 1.

The backlight unit of the display device may be a direct-type or an edge-type. In the direct type backlight unit, light emitting diodes are arranged at the rear area opposite to the entire surface of the display panel to directly radiate light. In the edge type backlight unit, light emitting diodes are arranged on the one or more edges of a light guide plate, for example, on both side edges of the light guide plate, to enable the light to be radiated to the inside of the light guide plate, and the light radiated to the light guide plate may be guided to the sides of the display panel 10 by the light guide plate.

For the direct type backlight unit, a substrate for a light emitting diode corresponding to the entire surface of the display panel 10 and a large number of light emitting diodes are required, and a lens for diffusing light is used for each light emitting diode. For the edge type backlight unit, an additional light guide plate is required, which may limit the molding method of the product, and may increase the thickness of the display device 1 due to the insertion of the light guide plate.

In order to reduce the thickness of the display device 1, the backlight unit 100 may be configured to include the substrate 142 including the plurality of light sources 141 only on one side of the display device 1. Also, the light emitted from the plurality of light sources 141 may be effectively radiated to the display panel 10 by utilizing the reflection characteristics of light instead of using the light guide plate.

In particular, the backlight unit 100 may include reflective members 110 and 120. For example, the backlight unit 100 may include the substrate 142 on which the plurality of light sources 141 are arranged, the first reflective member 110 and the second reflective member 120 that reflect light emitted from the plurality of light sources 141. The second reflective member 120 may reflect at least a portion of the light emitted from the plurality of light sources 141 toward the first reflective member 110. The first reflective member 110 may reflect light received directly from the plurality of light sources 141 and light reflected by the second reflective member 120 and incident on the display panel 10.

A first reflective surface 111 of the first reflective member 110 may be formed of a material having a diffusive property to disperse incident light toward the display panel 10. A second reflective surface 121 of the second reflective member 120 may be formed of a material having a reflection property to reflect the propagation direction of the light emitted from the plurality of light sources 141 to the first reflective member 110. The second reflective member 120 may be made of, for example, metal and may utilize the reflection characteristics of the material, or may be used by attaching a film or sheet having stronger reflection characteristics to the second reflective surface 121. The material of the surface on which light is reflected is not limited.

The plurality of light sources 141 of the backlight unit 100 may be arranged asymmetrically on one side of the display panel 10. Accordingly, the brightness of one side of the display panel 10 on which the plurality of light sources 141 are disposed may be brighter than the brightness of the other side due to a light bouncing phenomenon or the direct illumination of the plurality of light sources 141. The substrate 142 on which the plurality of light sources 141 are mounted may be disposed obliquely with respect to the display panel 10 such that the plurality of light sources 141 face the first and second reflective members 110 and 120. That is, the substrate 142 may be inclined such that the plurality of light sources 141 face the bottom chassis 50 located behind the display panel 10.

The substrate 142 may be disposed on the lower portion of the display panel 10. The plurality of light sources 141 may be disposed obliquely to face the rear side of the display panel 10. That is, the plurality of light sources 141 may be inclined toward the bottom chassis 50. Specifically, the substrate 142 may be disposed obliquely with respect to the display panel 10 such that the plurality of light sources 141 face the rear side of the display panel 10. The substrate 142 may be provided in a rectangular plate shape with one side extended and may include a mounting surface 143 on which the plurality of light sources 141 are arranged.

In order to more uniformly supply the light radiated from the plurality of light sources 141 disposed on one edge of the display panel 10 to the entire area of the display panel 10, the first reflective member 110 is formed in an area corresponding to the display panel 10 and may be disposed in front of the bottom chassis 50 which is located behind the diffusion plate 30. In addition, the first reflective member 110 may include the first reflective surface 111 configured in a concave shape toward the display panel 10. That is, the first reflective member 110 may include the first reflective surface 111 provided in a rearward concave shape. The plurality of light sources 141 may be disposed to face the first reflective surface 111.

On the other hand, when the plurality of light sources 141 are disposed on one edge of the display panel 10, the brightness of the light may decrease from one side of the display panel 10 toward the other side. In other words, when the plurality of light sources 141 are disposed on one side of the first reflective surface 111, the intensity of the light may decrease from one side of the first reflective surface 111 toward the other side. The second reflective member 120 may transmit the light emitted from the plurality of light sources 141 from the first reflective member 110 to a portion corresponding to the other edge of the display panel 10.

As shown in FIG. 5, the second reflective member 120 may be disposed adjacent to the light source module 140 to reflect light to direct at least some of the light generated in the plurality of light sources 141 to the first reflective member 110.

The second reflective member 120 may be provided in the form of a reflector. The second reflective member 120 may be disposed on the side facing the plurality of light sources 141. The second reflective member 120 may include the second reflective surface 121 configured in a concave shape toward the plurality of light sources 141. The second reflective surface 121 may reflect the light emitted from the plurality of light sources 141 to the first reflective member 110.

The second reflective surface 121 of the second reflective member 120 may be configured with a concave surface facing the plurality of light sources 141 and the first reflective surface 111 of the first reflective member 110. The second reflective surface 121 of the second reflective member 120 may be formed in, for example, a parabolic curved surface.

The second reflective member 120 may be disposed on the front lower side of the bottom chassis 50 in correspondence with the light source module 140. The second reflective member 120 may be disposed between the substrate 142 and the first reflective member 110 in the anteroposterior direction within the display device 1. The second reflective member 120 may guide at least a portion of the light emitted from the plurality of light sources 141 to the first reflective member 110.

The second reflective member 120 may be mounted on the substrate 142, on which the plurality of light sources 141 are disposed, to reflect light near the plurality of light sources 141. The second reflective member 120 may be mounted on one side of the substrate 142 and the other side thereof may be coupled to a supporting member 130. In an example embodiment, the second reflective member 120 may be integrally formed with the substrate 142.

The light source module 140 may be disposed on the lower left side, the right side, and/or the upper side of the bottom chassis 50. In an example embodiment, the second reflective member 120 may be disposed to correspond to the side on which the substrate 142 is disposed, and the second reflective surface 121 of the second reflective member 120 may be disposed concavely toward the plurality of light sources 141.

Also, one or more light source modules 140 may be disposed on opposite sides of the bottom chassis 50, respectively. That is, the one or more light source modules 140 may be symmetrically arranged on the upper and lower sides, or the left and right sides of the bottom chassis 50, respectively. For example, the second reflective member 120 may be provided corresponding to the number of the substrates 142 to reflect the light emitted from the plurality of light sources 141 disposed on the substrates 142 to the first reflective member 110.

The backlight unit 100 may include a reflective holder 150. The reflective holder 150 may be configured to reflect the light emitted from the plurality of light sources 141 to the display panel 10. In the display device 1, a portion of the display device 1 that is further apart from the plurality of light sources 141 may have lower light intensity, resulting in a dark portion. The reflective holder 150 may be disposed at a position further apart from the plurality of light sources 141 at the first and second reflective members 110 and 120 to reflect or disperse the light emitted from the plurality of light sources 141 and to more uniformly distribute the light to the display panel 10. For example, the reflective holder 150 may be disposed at one end of the first reflective member 110.

The plurality of light sources 141 may be disposed on one side of the display device 1 and the reflective holder 150 may be disposed on the other side of the display device 1. The plurality of light sources 141 may be arranged on the substrate 142 on one side of the display device 1 and correspondingly the reflective holder 150 may be arranged on the other side of the display device 1.

Referring to FIG. 6, the backlight unit 100 may include the supporting member 130 to which the light source module 140, the first reflective member 110, and the second reflective member 120 are mounted. The supporting member 130 is disposed on the lower front side of the bottom chassis 50 and may protrude in a forward direction from the bottom chassis 50.

However, embodiments are not limited thereto, and the substrate 142, the first reflective member 110 and the second reflective member 120 may be supported by a configuration other than the supporting member 130, and may be configured to be mounted directly to the bottom chassis 50. For example, the substrate 142, the first reflective member 110, and the second reflective member 120 may be mounted in a configuration such as a middle mold or disposed on the lower front of the bottom chassis. The supporting member 130 for supporting the substrate 142, the first reflective member 110 and the second reflective member 120 may also be integrally formed with the bottom chassis 50.

The light emitted from the plurality of light sources 141 may be reflected by the first reflective surface 111 disposed on the front side of the first reflective member 110 and directed toward the display panel 10. However, embodiments are not limited thereto, and the light emitted from the plurality of light sources 141 may be directly reflected to the bottom chassis 50 and radiated to the display panel 10.

That is, the bottom chassis 50 may be formed to include the first reflective surface 111, without the same configuration as the first reflective member 110. A reflective material may be coated or applied to the bottom chassis 50 to enhance the reflection efficiency of light, and a reflective sheet or the like may be attached to the front portion of the bottom chassis 50.

Hereinafter, the process of radiating the light generated from the plurality of light sources 141 to the display panel 10 or the diffusion plate 30 through the first reflective member 110 and the second reflective member 120 will be described in detail.

Figure 7:
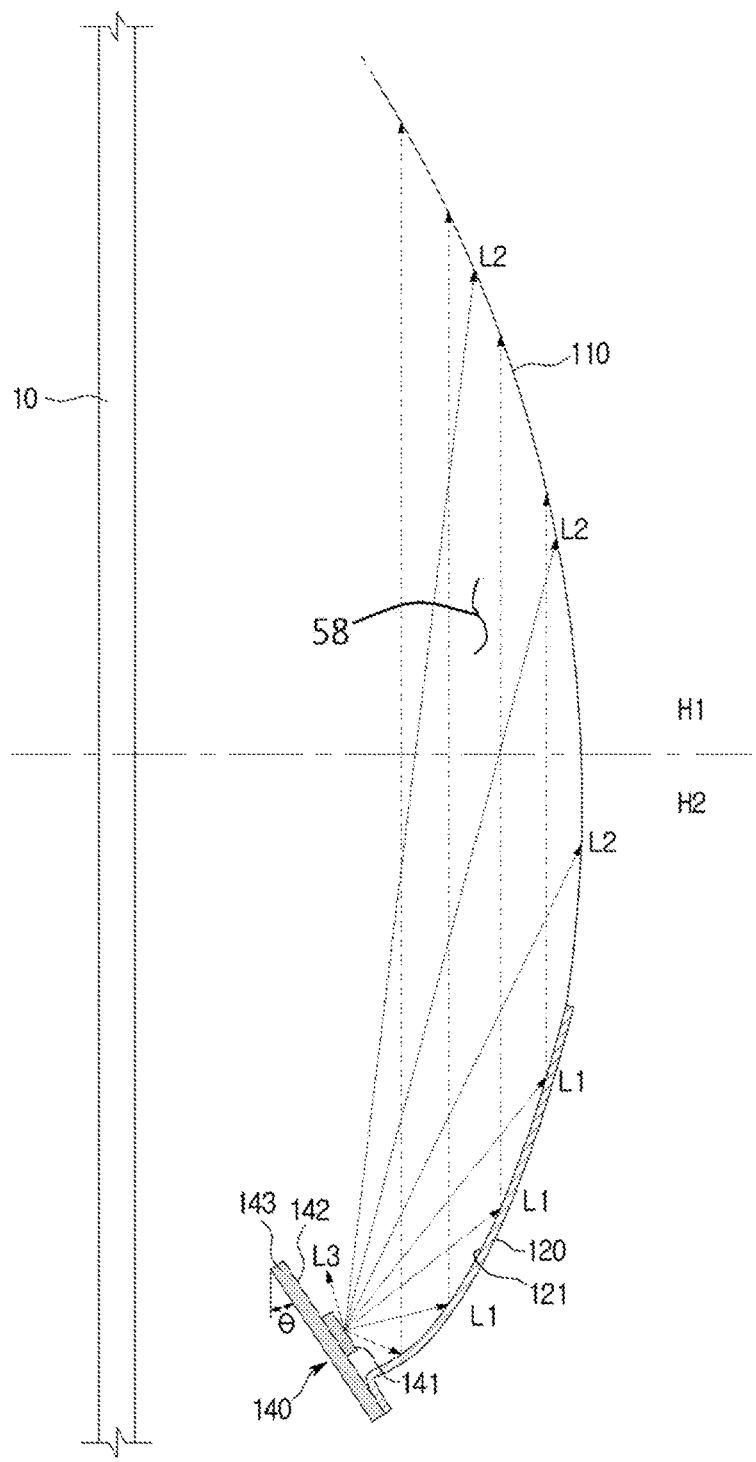
FIG. 7 is a view schematically showing one path of light to be radiated in a display device according to an example embodiment.

FIG. 7 is a view schematically showing one path of light to be radiated in a display device according to an example embodiment.

As shown in FIG. 7, the substrate 142 may be disposed such that the plurality of light sources 141 may face the first and second reflective members 110 and 120. For example, the mounting surface 143 of the substrate 142 may be disposed to face the bottom chassis 50. Accordingly, the mounting surface 143, which is the surface to which the light is radiated, may be disposed to face the opposite side of the display panel 10. The substrate 142 may be inclined so that the light from the plurality of light sources 141 may reach an upper portion H1 of the first reflective member 110. The angle at which light is radiated by the plurality of light sources 141 may be about 120 degrees because the amount of light that may reach the upper portion H1 of the first reflective member 110 is reduced when the substrate 142 is disposed horizontally with respect to the direction in which the first reflective member 110 extends.

Accordingly, the substrate 142 may be disposed at an inclined position. The angle θ forming the tilt with respect to the display panel 10 may be approximately 30 degrees. However, embodiments are not limited thereto, and the angle θ may change according to the shape in which the first and second reflective members 110 and 120 are formed.

As described above, unlike a display device including an edge type or direct-type backlight unit, the substrate 142 may be disposed only on one edge in the display device 1 having a quadrangular appearance. The amount of light to be radiated may be reduced in a portion where the substrate 142 is not disposed, compared to a portion where the substrate 142 is disposed.

For example, according to an example embodiment, when the substrate 142 is disposed on the lower side of the display panel 10, a large amount of light may be radiated to a lower portion H2 of the first reflective member 110 which is adjacent to the substrate 142. However, a large amount of light may not be radiated to the upper portion H1 of the first reflective member 110, which further apart from the substrate 142.

Accordingly, the light emitted to the first reflective member 110 may be non-uniform, and the light reflected by the first reflective member 110 may be radiated to the display panel 10 in a non-uniform manner.

That is, the amount of light radiated on the display panel 10 corresponding to the lower portion H2 of the first reflective member 110 may be more than the amount of light radiated to the portion of the display panel 10 corresponding to the upper portion H1 of the first reflective member 110. Accordingly, the brightness of the upper portion and the lower portion of the display panel 10 may be different, and the dark portion may be formed on the upper portion of the display panel 10 having a lower brightness.

The second reflective member 120 may be disposed between the plurality of light sources 141 and the first reflective member 110 to transmit light focused on the lower portion H2 of the first reflective member 110 to the upper portion H1.

The second reflective surface 121 of the second reflective member 120 may be configured with a concave surface facing the plurality of light sources 141 and the first reflective member 110. With this configuration, the light emitted from the plurality of light sources 141 may be reflected from the second reflective member 120 toward the first reflective member 110.

Specifically, the second reflective member 120 may reflect at least a portion of the light emitted from the plurality of light sources 141 from the second reflective surface 121. The reflected light may propagate parallel to the display panel 10 by the concave angle of the second reflective surface 121. Accordingly, the second reflective member 120 may transmit light, while reducing or minimizing the loss of light, to the other edge of the first reflective surface 111 on which the plurality of light sources 141 is not disposed.

The second reflective surface 121 may include a parabolic curved surface. In addition, the plurality of light sources 141 may be positioned at the focal point of a parabola forming the second reflective surface 121. Also, the first reflective member 110 may be disposed in a direction in which the axis of the parabolic curve of the second reflective surface 121 faces.

When the light emitted from the plurality of light sources 141 reaches the second reflective surface 121, the light may be reflected on the second reflective surface 121 and reflected in a direction parallel to the axis of the parabola because the plurality of light sources 141 are disposed at the focal point of the parabolic curve of the second reflective surface 121.

Accordingly, light L1 reflected through the second reflective surface 121 may be directed in one direction. The first reflective surface 111 of the first reflective member 110 may be disposed in the parabolic axis direction of the second reflective surface 121. In this configuration, the light L1 reflected through the second reflective surface 121 may reach the first reflective surface 111 of the first reflective member 110.

For example, the light L1 emitted from the plurality of light sources 141 toward the second reflective surface 121 may be reflected in the parabolic axis direction of the second reflective surface 121. The reflected light may be directed toward the display panel 10 by the first reflective member 110 after reaching the upper portion H1 of the first reflective member 110.

In the absence of the second reflective member 120, light corresponding to L1 may be radiated to the lower portion H2 of the first reflective member 110. Therefore, the difference of the light radiated to the upper portion H1 and the lower portion H2 of the first reflective member 110 may be very large. A portion of the light radiated to the lower portion H2 of the first reflective member 110 by the second reflective member 120 may reach the upper portion H1 of the first reflective member 110 to cancel the difference in the amount of light.

As shown in FIG. 7, a portion of the light L1 emitted from the plurality of light sources 141 may be directed to the upper portion H1 of the first reflective member 110 via the second reflective member 120. Light L2 radiated upward from the second reflective member 120 of the light emitted from the plurality of light sources 141 may be reflected directly to the first reflective member 110 and may reach the display panel 10. A portion of the light L2 may reach the lower portion H2 of the first reflective member 110 and the other portion may reach the upper portion H1 of the first reflective member 110.

In addition, another portion of the light emitted from the plurality of light sources 141 may be directly radiated toward the display panel 10 without being reflected by the first and second reflective members 110 and 120 (L3).

As described above, since the plurality of light sources 141 are disposed adjacent to the lower portion H2 of the first reflective member 110, most of the light emitted from the plurality of light sources 141 may reach the lower portion H2. In order to compensate for this non-uniformity, a portion of the light reaching the lower portion H2 through the second reflective member 120 may be reflected to the upper portion H1.

As shown in FIG. 2, the first reflective member 110 may be configured to correspond to the shape of the bottom chassis 50. The first reflective member 110 may be formed concavely in both the horizontal direction and the vertical direction.

Referring to FIG. 5, the first reflective surface 111 of the first reflective member 110 may be formed in a concave shape toward the display panel 10. The first reflection surface 111 may be formed in a concave shape in the vertical direction by the upper reflection surface 113 and the lower reflection surface 112. Further, the first reflection surface 111 may be provided in a concave shape in the horizontal direction by the side reflection surfaces 114 provided on both sides.

The upper, lower, and side reflective surfaces 112, 113, and 114 may be inclined so that the center of the first reflective surface 111 is recessed rearward. Also, the top, bottom, and side reflective surfaces 112, 113, 114 may include curved shapes, but embodiments are not limited thereto, and may include straight shapes.

The bottom chassis 50 may also be recessed to correspond to the first reflective member 110 being concavely formed. The bottom chassis 50 may include a chassis body 52 at least partially curved and a chassis flange 54 formed in the chassis body 52. The chassis body 52 may form a reflective space 58 (see FIG. 3) through which the light from the plurality of light sources 141 and the light reflected by the first and second reflective members 110 and 120 may pass. The reflective space 58 may be formed in front of the first and second reflective members 110 and 120. The chassis flange 54 may be configured to form the reflective space 58 with the chassis body 52 and may be configured to project forward from the chassis body 52 to define a perimeter of the reflective space 58. The chassis flange 54 may form a perimeter of the reflective space 58 in a generally rectangular shape.

The first reflective member 110 may comprise an expanded polystyrene (EPS) material. The EPS material may have a plurality of fine pores arranged on its surface area. Accordingly, a plurality of fine pores may be formed in the surface area of the first reflective member 110. The light incident on the first reflective member 110 may be non-uniformly reflected by the plurality of fine pores and may be directed to the display panel 10.

The light incident on the front surface of the upper, lower, and side reflective surfaces 112, 113, and 114 may be reflected in various directions without being reflected toward the display panel 10 in a state where the light may be biased in one direction. The optical density may be relatively uniformly formed.

The side reflective surface 114 may be disposed adjacent to the substrate 142 such that the amount of light incident on the side reflective surface 114 is less than the amount of light incident on the upper reflective surface 112 and the lower reflective surface 113.

When the amount of light incident on each of the reflective surfaces 112, 113 and 114 is non-uniform, it may be difficult for the light to uniformly enter the entire surface of the display panel 10 as described above. Therefore, when the plurality of light sources 141 are arranged at regular intervals in the direction of a long side 103 of the substrate 142, the amount of light incident on the central portion of the display panel 10 may be relatively reduced. This may cause an arm portion to be formed on the center of the display panel 10.

In order to prevent or reduce the arm portion from being formed, the light sources 141 may be arranged on the substrate 142 at different intervals along the left and right direction or the front and back direction. That is, the distance between the plurality of light sources 141 according to an example embodiment may be changed according to the shape of the first reflective member 110.

Uniformity of luminance on the display panel 10 may be improved if the light radiated from the plurality of light sources 141 are uniformly reflected by the first reflective member 110 and the second reflective member 120. Also, the performance of the display device 1 may be improved.

Figure 8:
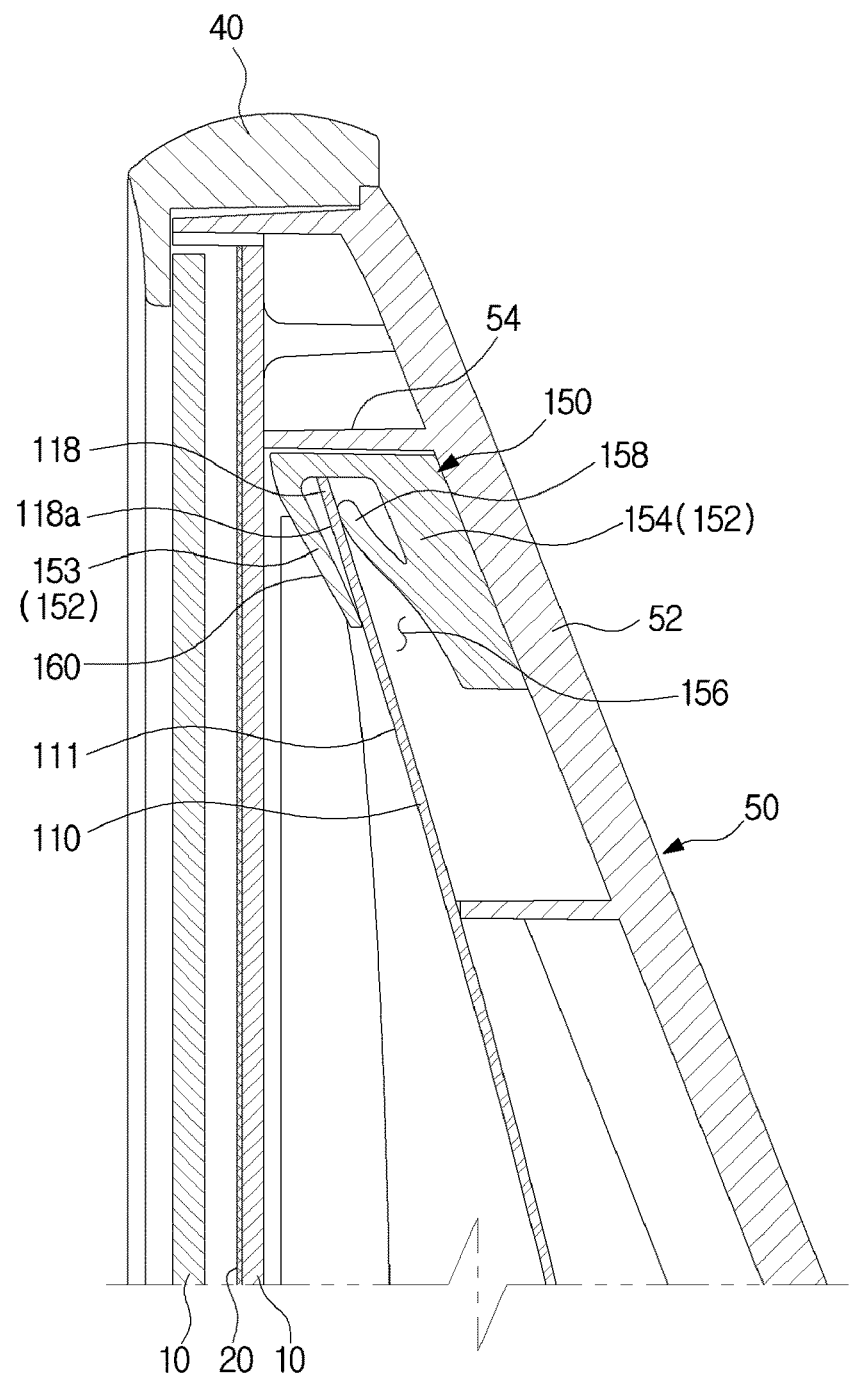
FIG. 8 is an enlarged view of B in FIG. 3.
Figure 9:
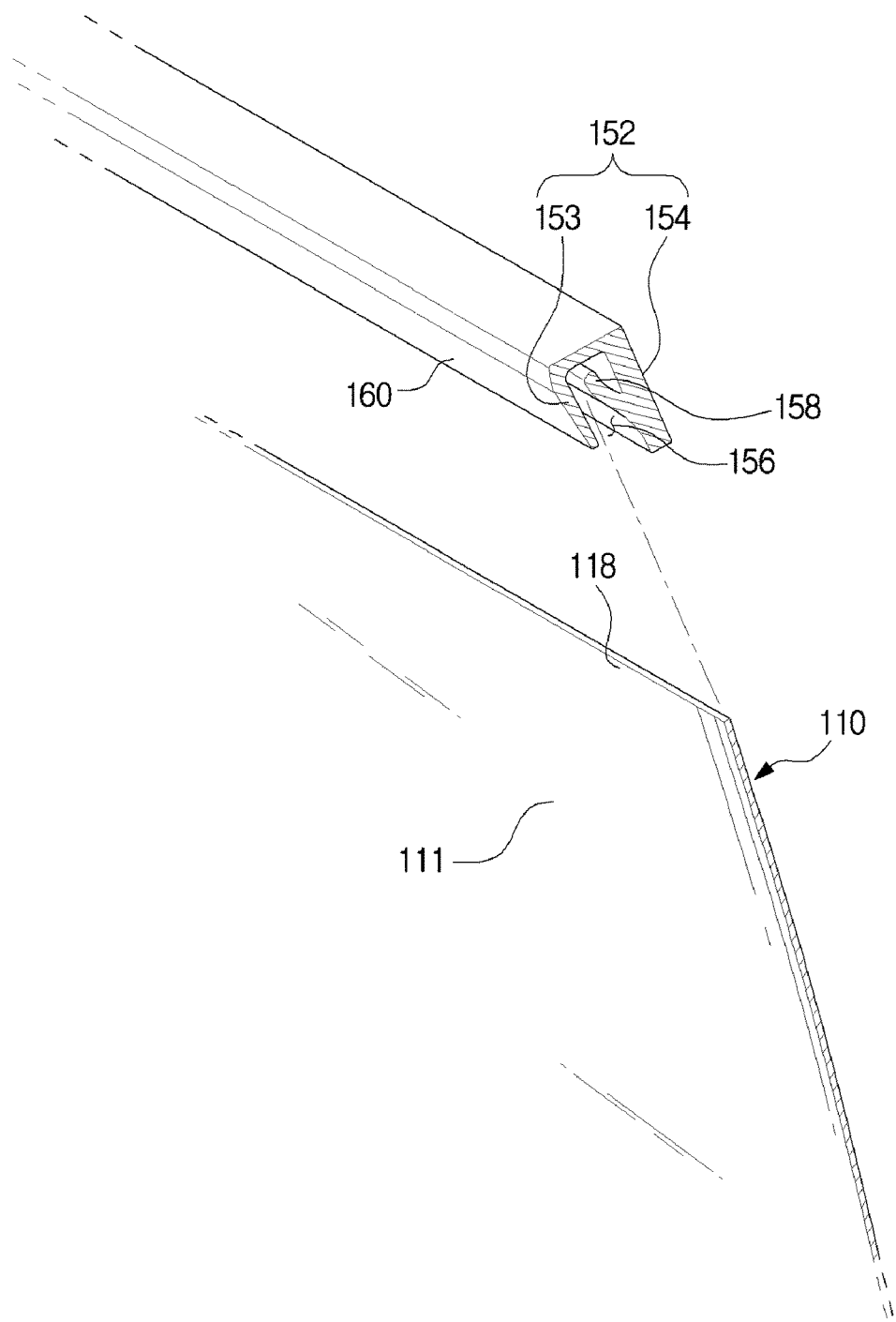
FIG. 9 is a view showing a combination of a first reflection member and a reflection holder in a display device according to an example embodiment.
Figure 10:
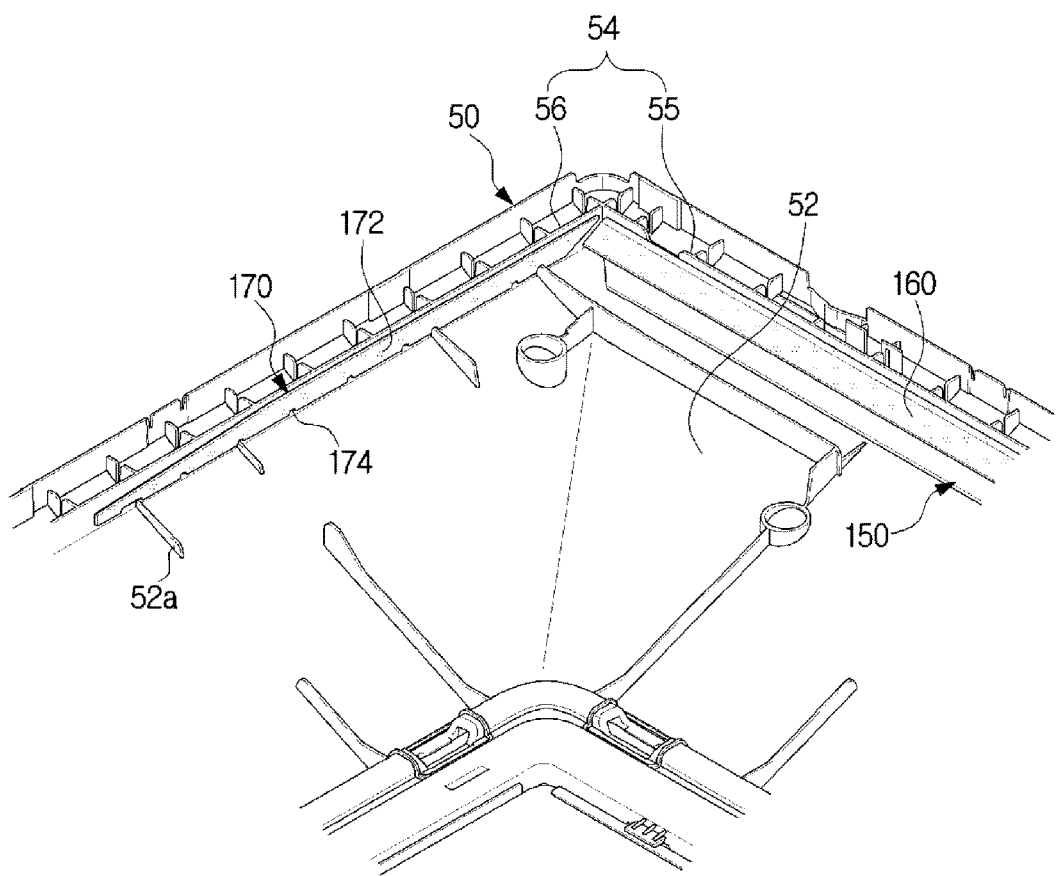
FIG. 10 is a view showing the arrangement of a reflection holder and a flange reflection member in a display device according to an example embodiment.

FIG. 8 is an enlarged view of B in FIG. 3. FIG. 9 is a view showing a combination of a first reflection member and a reflection holder 150 in a display device according to an example embodiment. FIG. 10 is a view showing the arrangement of a reflection holder 150 and a flange reflection member in a display device according to an example embodiment.

The backlight unit 100 may include the reflective holder 150. The reflective holder 150 may be configured to reflect the light emitted from the plurality of light sources 141 to the display panel 10.

The plurality of light sources 141 may be disposed on one edge of the display device 1 and the reflective holder 150 may be disposed on the other edge of the display device 1.

The reflective holder 150 may be configured such that one end of the first reflective member 110 is fixed to the reflective holder 150. The reflective holder 150 may be mounted to the bottom chassis 50 and may be configured to secure one side of the first reflective member 110.

The reflective holder 150 may include holder body 152 including a first holder body 153 and a second holder body 154. The first and second holder bodies 153 and 154 may form an insertion space 156 therebetween. At least a portion of one end of the first reflective member 110 may be configured to be inserted into the insertion space 156. The first holder body 153 may form one side of the insertion space 156 and the second holder body 154 may form the other side of the insertion space 156. The second holder body 154 may be in contact with the bottom chassis 50 to mount the reflective holder 150 to the bottom chassis 50. The manner in which the reflective holder 150 is mounted to the bottom chassis 50 is not limited. In example embodiments, the reflective holder 150 may be screwed to the bottom chassis 50, adhered by an adhesive, or may be joined via a separate mating member.

Since the first holder body 153 is disposed closer to the display panel 10 than the second holder body 154, the first holder body 153 may be referred to as the front holder body 153 and the second holder body 154 may be referred to as the rear holder body 154. The shape of the holder body 152 is not limited, but may be formed to have a substantially 'c' shape, for example.

The first reflective member 110 may include a member insertion portion 118 inserted into the insertion space 156. The member insertion portion 118 may be configured as a portion of the first reflective member 110. The member insertion portion 118 may be inserted and fixed in the insertion space 156 so that one side of the first reflective member 110 may be supported or fixed to the reflective holder 150. Also, the reflective holder 150 may fix one end of the first reflective member 110, thereby preventing or reducing the first reflective member 110 from turning.

The second holder body 154 may also be configured such that the member insertion portion 118 is spaced apart from the chassis body 52 of the bottom chassis 50. That is, the second holder body 154 may support the first reflective member 110 by adjusting the thickness according to the concave angle of the first reflective surface 111 applied to the display device 1. The thickness of the second holder body 154 may increase if the first reflective member 110 and the chassis body 52 are spaced apart from each other according to the concave degree of the first reflective surface 111. On the other hand, when the distance between the first reflective member 110 and the chassis body 52 is narrower, the thickness of the second holder body 154 may be reduced. Whereby the first reflective member 110 may be supported.

The reflective holder 150 may include a holder reflective surface 160. The holder reflective surface 160 may be configured to extend from the first reflective surface 111.

The holder reflective surface 160 may be formed on the front surface of the first holder body 153. The holder reflective surface 160 may be disposed closer to the display panel 10 than the member insertion portion 118. With this configuration, light reflected by the holder reflective surface 160 may be more efficiently transmitted to the display panel 10.

The holder reflective surface 160 may be formed oblique to the display panel 10 and to be tilted from the reflective holder 150 adjacent the first reflective surface 111. The holder reflective surface 160 may be formed to be inclined closer to the display panel 10 than the reflective surface of the adjacent first reflective member 110. That is, the holder reflective surface 160 may be configured to face the display panel 10 and be inclined toward the plurality of light sources 141 rather than the first reflective surface 111 of the adjacent first reflective member 110. In other words, when the angle formed by the first reflective surface 111 of the first reflective member 110 adjacent to the holder reflective surface 160 and the display panel 10 is $\alpha$, the holder reflective surface 160 may have an angle $\beta$ greater than $\alpha$ with the display panel 10. In this configuration, the holder reflective surface 160 may expose an area exposed to the plurality of light sources 141 or the first and second reflective members 110 and 120 at one end of the first reflective member 110. In particular, the holder reflective surface 160 may expose an area exposed to light reflected from the second reflective member 120. However, embodiments are not limited thereto, and $\alpha$ and $\beta$ may be the same, or $\alpha$ may be larger than $\beta$. The relationship between $\alpha$ and $\beta$ may vary depending on the amount of light emitted to the display panel 10 adjacent to the reflective holder 150.

The holder reflective surface 160 may be configured to be wider than the width of the member insertion portion 118. For example, the width of the holder reflective surface 160 may be wider than a reflective surface 118a of the member insertion portion 118 inserted into the insertion space 156. With this configuration, for the side of the display device 1 further apart from the plurality of light sources 141 in the reflective member, the holder reflective surface 160 may serve to expand the area of the first reflective surface 111 of the first reflective member 110.

The reflective holder 150 may include a pressing projection 158.

The pressing projection 158 may protrude from the second holder body 154 into the insertion space 156 for securing the member insertion portion 118 of the first reflective member 110 inserted into the insertion space 156. The shape of the pressing projection 158 is not limited. The reflective holder 150 may fix the first reflective member 110 by the second holder body 154 without the pressing projection 158. The pressing projection 158 may be formed to have elasticity to elastically support the member insertion portion 118 of the first reflective member 110.

The reflective holder 150 may be disposed along the inside of the chassis flange 54. The chassis flange 54 may be configured to have a constant height from the chassis body 52 of the bottom chassis 50. The chassis flange 54 may be disposed along the periphery of the first reflective member 110. From light emitted from the plurality of light sources 141 or reflected by the first and second reflective members 110 and 120, the light directed toward the outer side of the display panel may be blocked by the chassis flange 54. The reflective holder 150 may be configured along the inside of the chassis flange 54 to reduce or minimize blind spots in which light is transmitted to the display panel 10. That is, the holder reflective surface 160 of the reflective holder 150 may be disposed along the inside of the chassis flange 54, thereby reducing or minimizing the obstruction of the path of light by the chassis flange 54.

Referring to FIG. 10, the backlight unit 100 may include a flange reflective member 170 extending from the first reflective surface 111 of the first reflective member 110.

The chassis flange 54 may include a first chassis flange 55 on which the reflective holder 150 is disposed and a second chassis flange 56 extending from opposite ends of the first chassis flange 55. The flange reflective member 170 may be disposed on the inner surface of the second chassis flange 56. For example, the flange reflective member 170 may be located at a portion of the second chassis flange 56 adjacent to the first chassis flange 55. That is, the flange reflective member 170 may be located at a position further apart from the plurality of light sources 141 in the second chassis flange 56.

The flange reflective member 170 may serve to extend the reflective surface of the first reflective member 110. That is, in detail, the flange reflective member 170 may include a flange reflective surface 172 extending from the first reflective surface 111 of the first reflective member 110. The flange reflective member 170 may reflect light from the plurality of light sources 141 or reflective members to reduce or prevent light from concentrating or focusing on a portion of the first reflective member 110 that is further apart from the plurality of light sources 141, and to be more uniformly distributed to the outer portion of the display panel 10.

The flange reflective member 170 may be formed on at least a portion of the inner surface of the second chassis flange 56, for example, in a shape of a sheet. The shape of the flange reflective member 170 however, is not limited thereto.

The flange reflective member 170 may include a groove portion 174. The chassis body 52 may be provided with a plurality of reinforcing ribs 52a for the reinforcement of the bottom chassis 50. The groove portion 174 may be configured to allow the plurality of reinforcing ribs 52a to pass so that the flange reflective member 170 is not interfered with by the plurality of reinforcing ribs 52a. The flange reflective member 170 may be brought into close contact with the inner surface of the second chassis flange 56 through the groove portion 174 to reduce or minimize the gap between the first reflective member 110 and the flange reflective member 170. This configuration may reduce, minimize, or eliminate blind spots in the reflective space 58.

The reflective holder 150 may include a synthetic resin. The holder reflective surface 160 may be configured to be attached to the holder body 152 in a separate configuration in the holder body 152 or may be integrally formed with the holder body 152. The reflective holder 150 may also be constructed as part of the holder body 152 using a highly reflective synthetic resin.

The reflective holder 150 may be formed in an achromatic color. That is, when the dark part of the display panel 10 on the side of the reflective holder 150 located further apart from the plurality of light sources 141 is generated, the reflective holder 150 may be formed of a gray series closer to white or white color. Conversely, when the light is concentrated on the display panel 10 on the reflective holder 150, the reflective holder 150 may be formed of a gray series closer to black to reduce the reflectance of light.

Figure 11:
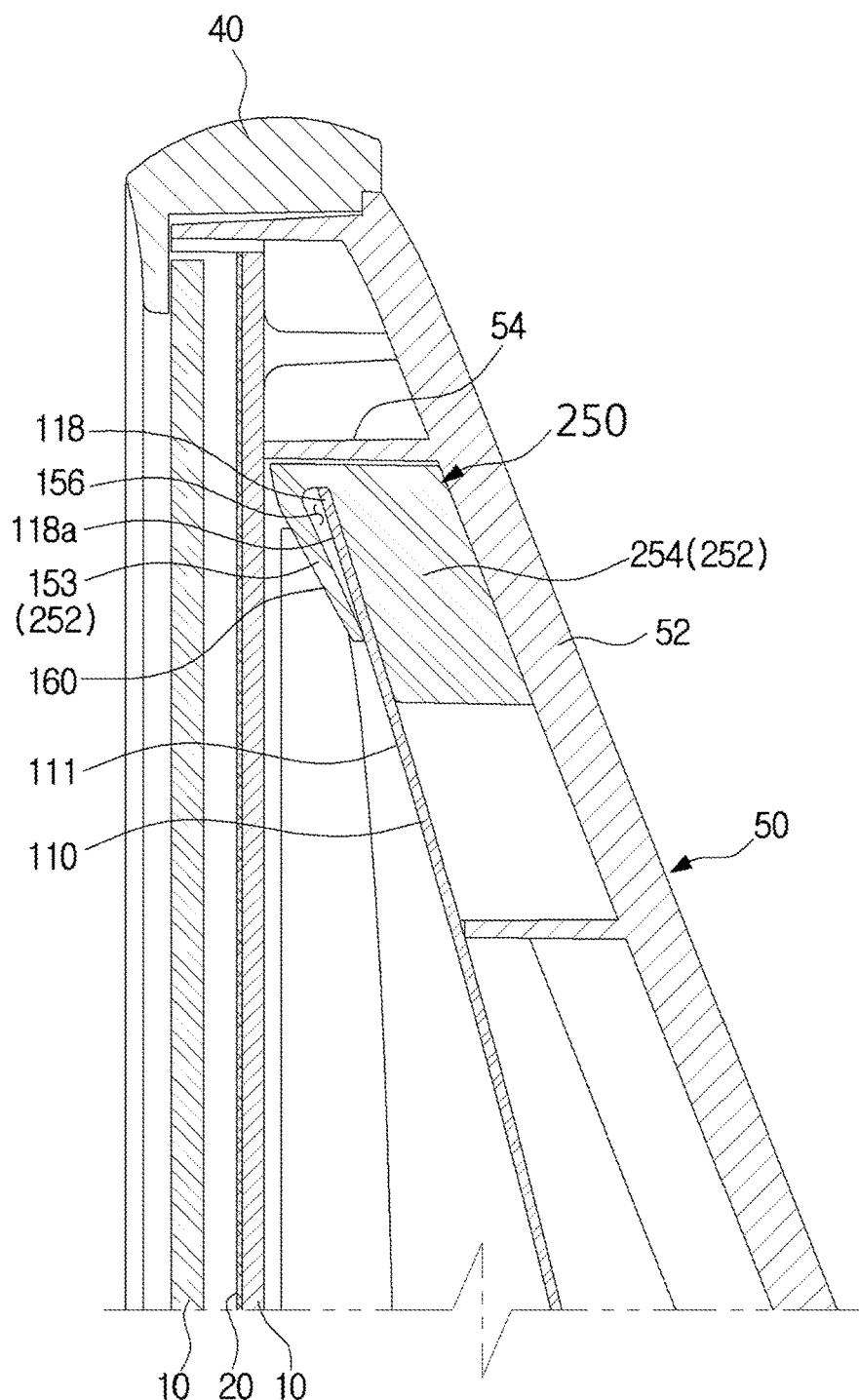
FIG. 11 is a sectional view of a reflective holder and a configuration adjacent to a reflective holder in a display device according to an example embodiment.

FIG. 11 is a sectional view of a reflective holder 250 and a configuration adjacent to the reflective holder 250 in a display device according to an example embodiment.

A reflective holder 250 may include a holder body 252 including the first holder body 153 and a second holder body 254. The first and second holder bodies 153 and 254 may form the insertion space 156 therebetween. At least a portion of one end of the first reflective member 110 may be configured to be inserted into the insertion space 156. The first holder body 153 may form one side of the insertion space 156 and the second holder body 254 may form the other side of the insertion space 156. The insertion space 156 formed between the first holder body 153 and the second holder body 254 may be narrowed so that the first reflective member 110 may fit. That is, the insertion space 156 formed between the first holder body 153 and the second holder body 254 may be configured to correspond to the thickness of the first reflective member 110.

The second holder body 254 may be in contact with the bottom chassis 50 to mount the reflective holder 250 to the bottom chassis 50. However, the configuration in which the reflective holder 250 is mounted to the bottom chassis 50 is not limited thereto. For example, the reflective holder 250 may be threaded to the bottom chassis 50, adhered to the bottom chassis 50, or joined via separate joining members.

Example embodiments may improve the uniformity of light by dispersing the light emitted from a plurality of light sources to the entire display panel by using the reflective surface of the reflective member without using a member such as a light guide plate.

Further, since there is no member such as a light guide plate, the structure of the display device may be more simplified, which may improve productivity.

Example embodiments have been illustrated and described, however, the present disclosure is not limited thereto, and may be variously modified and changed by those skilled in the art without departing from the scope of the present disclosure as defined by the following claims.

What is claimed is:

1. A display device comprising:
a display panel;
a bottom chassis supporting the display panel;
a light source provided on at least one side of the bottom chassis;
a reflective member provided between the display panel and the bottom chassis and comprising a reflective surface configured to reflect light emitted from the light source to the display panel; and
a reflective holder configured to fix one end of the reflective member and to reflect light emitted from the light source toward the reflective holder to the display panel,
wherein the light source is disposed to face the reflective surface on a first edge of the reflective member.

2. The display device of claim 1, wherein the reflective holder comprises a holder reflective surface extending from the reflective surface.

3. The display device of claim 2, wherein an inclination of the holder reflective surface is different from an inclination of the reflective surface adjacent to the reflective holder.

4. The display device of claim 2, wherein the reflective holder further comprises a holder body having an insertion space into which at least a part of the reflective member is inserted.

5. The display device of claim 4, wherein the reflective member comprises a member insertion portion inserted into the insertion space, and
the holder reflective surface is disposed closer to the display panel than the member insertion portion.

6. The display device of claim 4, wherein the holder body comprises:
an upper holder body on which the holder reflective surface is provided; and
a lower holder body in contact with the bottom chassis, the lower holder body and the upper holder body together forming the insertion space, and
wherein the reflective member is configured to be spaced apart from the bottom chassis.

7. The display device of claim 5, wherein a width of the holder reflective surface is greater than a width of the member insertion portion.

8. The display device of claim 4, wherein the reflective member has a concave shape, and
the reflective holder is disposed on a second edge of the reflective member.

9. The display device of claim 4, wherein the holder reflective surface opposite to the display panel and is disposed to be inclined at an angle in a direction toward the light source greater than an angle at which the reflective surface is inclined.

10. The display device of claim 1, wherein the reflective member comprises:
a first reflective member fixed by the reflective holder and configured to diffuse light emitted from the light source toward the display panel; and
a second reflective member disposed between the light source and the first reflective member and configured to reflect the light emitted from the light source toward the first reflective member.

11. The display device of claim 1, wherein the bottom chassis comprises:
a chassis body configured to support the reflective member, the chassis body being at least partially curved;
a reflective space formed between the display panel and the reflective member, the reflective space through which the light emitted from the light source and the light reflected by the reflective member pass; and
a chassis flange protruding from the chassis body towards the display panel and configured to form the reflective space with the chassis body, and
wherein the reflective holder is disposed along an inner surface of the chassis flange.

12. The display device of claim 11, wherein the chassis flange comprises a first chassis flange on which the reflective holder is disposed, and a pair of second chassis flanges extending from opposite ends of the first chassis flange, and
the display device further comprises a flange reflective member disposed on an inner surface of the second chassis flange and extending a length of the reflective surface.

13. The display device according to claim 1, wherein the reflective holder comprises a synthetic resin.

14. The display device of claim 2, wherein the holder reflective surface is formed in an achromatic color.

15. The display device of claim 4, wherein the holder body comprises:
- a first holder body on which the holder reflective surface is formed; and
- a second holder body fixed to the bottom chassis, and
- wherein the reflective holder comprises a pressing projection protruding from the second holder body into the insertion space and configured to secure the reflective member inserted into the insertion space.

16. A display device comprising:
- a display panel;
- a bottom chassis supporting the display panel;
- a light source disposed in the bottom chassis;
- a reflective member comprising:
  - a first reflective member opposite to the display panel and comprising a reflective surface having a concave shape and configured to diffuse light emitted from the light source toward the display panel, and
  - a second reflecting member disposed between the light source and the first reflecting member and configured to reflect light emitted from the light source toward the first reflecting member; and
- a reflective holder comprising a holder reflective surface extending from a reflective surface of the first reflective member to reflect light to the display panel and configured to fix the first reflective member to the bottom chassis,
- wherein the light source is disposed opposite to the first and second reflective members at a first edge of the reflective member.

17. The display device of claim 16,
- wherein the reflective holder is disposed on a second edge of the reflective member such that the holder reflective surface is opposite to the display panel and is inclined toward one of the light source or the reflective member.

18. The display device of claim 16, wherein the reflective holder comprises a holder body having an insertion space and on which the holder reflective surface is provided,
- the reflective member comprising a member insertion portion inserted into the insertion space.

19. The display device of claim 18, wherein a width of the holder reflective surface is greater than a width of the member insertion portion.

20. A display device comprising:
- a display panel;
- a bottom chassis supporting the display panel;
- a light source provided on a side of the bottom chassis;
- a reflective member provided between the bottom chassis and the display panel, and comprising a reflective surface opposite to the display panel, the reflective surface configured to reflect light emitted from the light source to the display panel; and
- a reflective holder comprising an insertion space and configured to receive a member insertion portion formed at one edge of the reflective member into the insertion space,
- wherein the reflective holder comprises a holder reflective surface having a width that is wider than the member insertion portion and an inclination angle with respect to the display panel that is greater than an inclination angle of the reflective surface adjacent to the reflective holder,
- wherein the light source is disposed to face the reflective surface on a first edge of the reflective member.

* * * * *